United States Patent
Stidham et al.

(10) Patent No.: US 6,988,761 B1
(45) Date of Patent: Jan. 24, 2006

(54) INTERLOCKING CHANNELED TRAILER SIDE PANELS WITH INTEGRATED SLIDING OUTER PANEL INSERTS

(76) Inventors: Brian Stidham, P.O. Box 1691, Chickasha, OK (US) 73023; Robbie Stidham, P.O. Box 1691, Chickasha, OK (US) 73023

( * ) Notice: Subject to any disclaimer, the term of this patent is extended or adjusted under 35 U.S.C. 154(b) by 0 days.

(21) Appl. No.: 10/891,382

(22) Filed: Jul. 14, 2004

Related U.S. Application Data

(60) Provisional application No. 60/546,888, filed on Feb. 23, 2004.

(51) Int. Cl.
*B60J 5/00* (2006.01)
(52) U.S. Cl. .................. 296/186.1; 296/191; 52/588.1; 52/309.9; 40/618
(58) Field of Classification Search ............. 296/186.1, 296/191
See application file for complete search history.

(56) References Cited

U.S. PATENT DOCUMENTS

| | | | | |
|---|---|---|---|---|
| 1,913,342 | A | | 6/1933 | Schaffert |
| 2,284,626 | A | * | 6/1942 | Adler .......................... 40/576 |
| 3,043,407 | A | | 7/1962 | Marryatt |
| 3,110,371 | A | | 11/1963 | Ridder |
| D216,480 | S | | 1/1970 | Wilson |
| 3,574,964 | A | * | 4/1971 | Ownbey ....................... 40/618 |
| 3,720,012 | A | * | 3/1973 | Loper .......................... 40/618 |
| 3,802,103 | A | * | 4/1974 | Neff ............................. 40/591 |
| 4,104,840 | A | * | 8/1978 | Heintz et al. ............... 52/309.9 |
| 5,050,362 | A | * | 9/1991 | Tal et al. ..................... 52/588.1 |
| 5,052,137 | A | * | 10/1991 | Edwards ...................... 40/618 |
| 5,052,741 | A | | 10/1991 | Brown |
| 5,184,864 | A | * | 2/1993 | Teigen et al. ............. 296/186.4 |
| 5,185,193 | A | * | 2/1993 | Phenicie et al. ........... 52/588.1 |
| 5,247,773 | A | * | 9/1993 | Weir ......................... 52/309.9 |
| 5,448,865 | A | * | 9/1995 | Palmersten ................ 52/588.1 |
| 5,502,939 | A | * | 4/1996 | Zadok et al. ............... 52/309.9 |
| 5,526,622 | A | | 6/1996 | Augustine |
| 5,613,726 | A | * | 3/1997 | Hobbs et al. ............. 296/186.1 |
| 5,657,566 | A | * | 8/1997 | Key ............................ 40/618 |
| 5,664,386 | A | * | 9/1997 | Palmersten ................ 52/588.1 |

(Continued)

*Primary Examiner*—Kiran B. Patel
(74) *Attorney, Agent, or Firm*—Randal D. Homburg

(57) ABSTRACT

A metal trailer interlocking panel attached to a trailer frame used in the construction of an enclosed or paneled trailer, preferably in a horizontal and stacked orientation, includes an upper groove assembly and a conforming and interlocking lower groove assembly, an inner surface welded to a vertical trailer frame member and an outer surface having a lower slot member and an upper slot member forming a sliding channel within which is slid a horizontal outer panel insert riveted to the panel. In the event the panel insert is damaged by hail, road debris, branches or other accidental means, or a simple change in aesthetics or display medium is desired, the panel insert may be exchanged without requiring replacement ofthe panel. The panel insert may also have an ornamental design or graphic applied to an outer surface, which enables the trailer owner to apply a variety of panel inserts and exchange graphics without having to repaint the entire trailer, and also to allow for change of information which may be applied to the panel inserts for advertising or other textual information.

5 Claims, 5 Drawing Sheets

U.S. PATENT DOCUMENTS

| | | | |
|---|---|---|---|
| 5,715,641 A | * | 2/1998 | Hall, Jr. .................. 52/578 |
| 5,791,726 A | * | 8/1998 | Kaufman ................ 296/191 |
| D410,868 S | | 6/1999 | Hall, Jr. |
| D430,069 S | * | 8/2000 | Collie et al. ............ D12/106 |
| 6,224,142 B1 | * | 5/2001 | McCormack .......... 296/186.1 |
| 6,345,481 B1 | * | 2/2002 | Nelson ................... 52/592.2 |
| 6,652,018 B2 | | 11/2003 | Buchholz |
| 6,823,638 B2 | * | 11/2004 | Stanchfield ............ 52/588.1 |
| 6,824,341 B2 | * | 11/2004 | Ehrlich ................... 296/191 |
| 2001/0009085 A1 | * | 7/2001 | Boyer ..................... 52/588.1 |

* cited by examiner

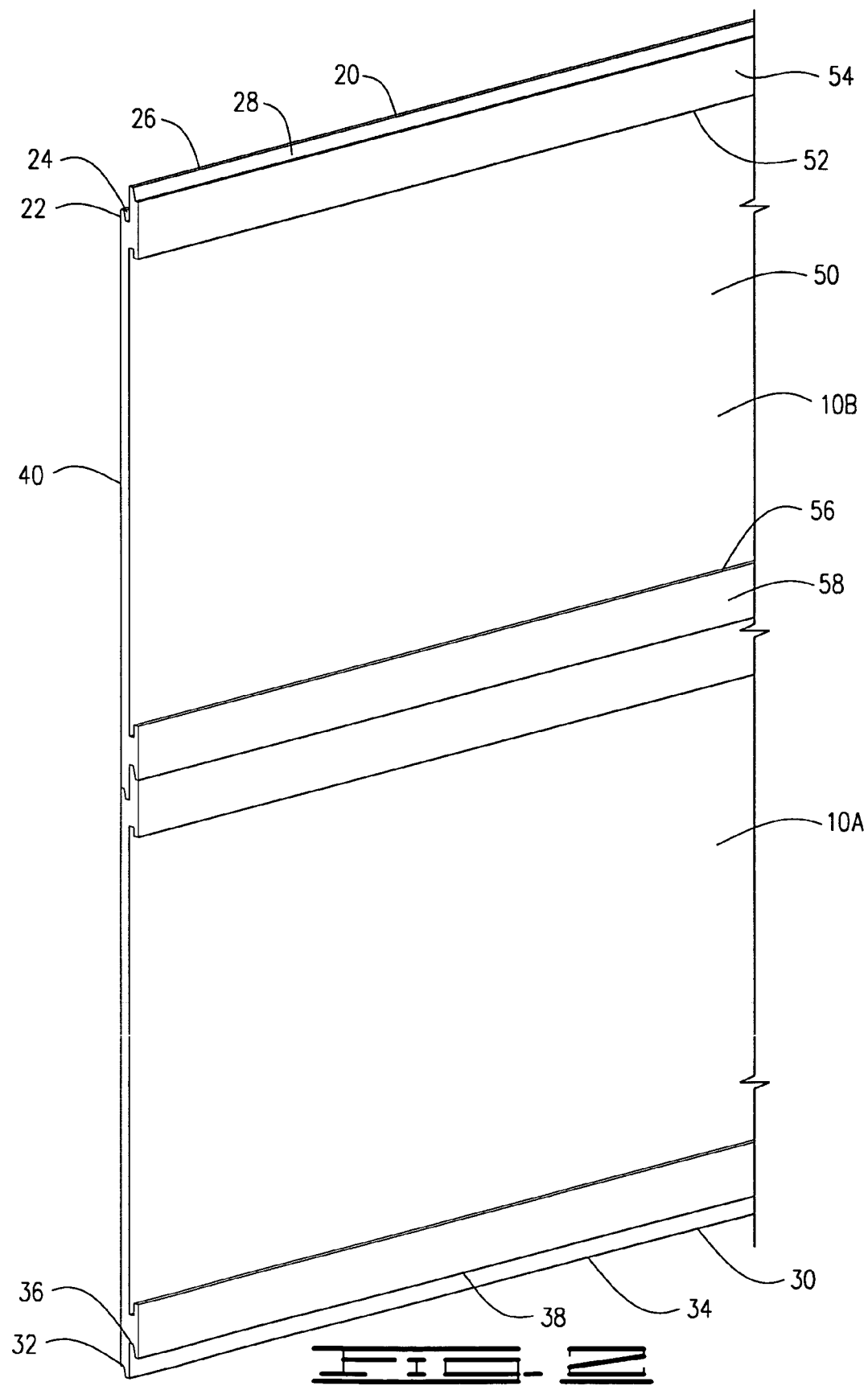

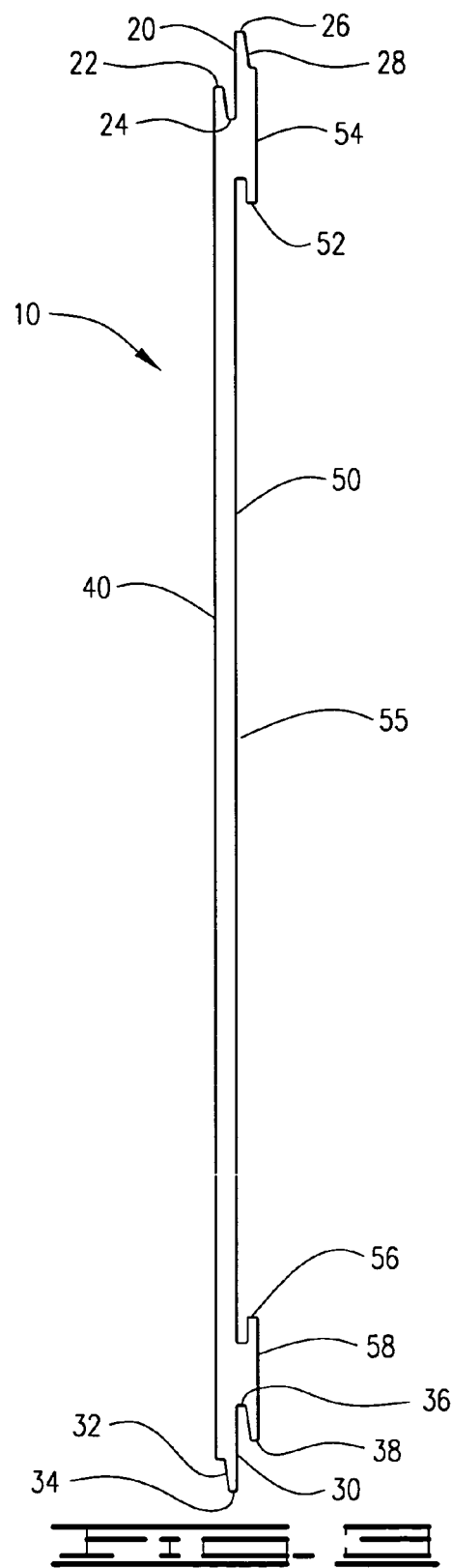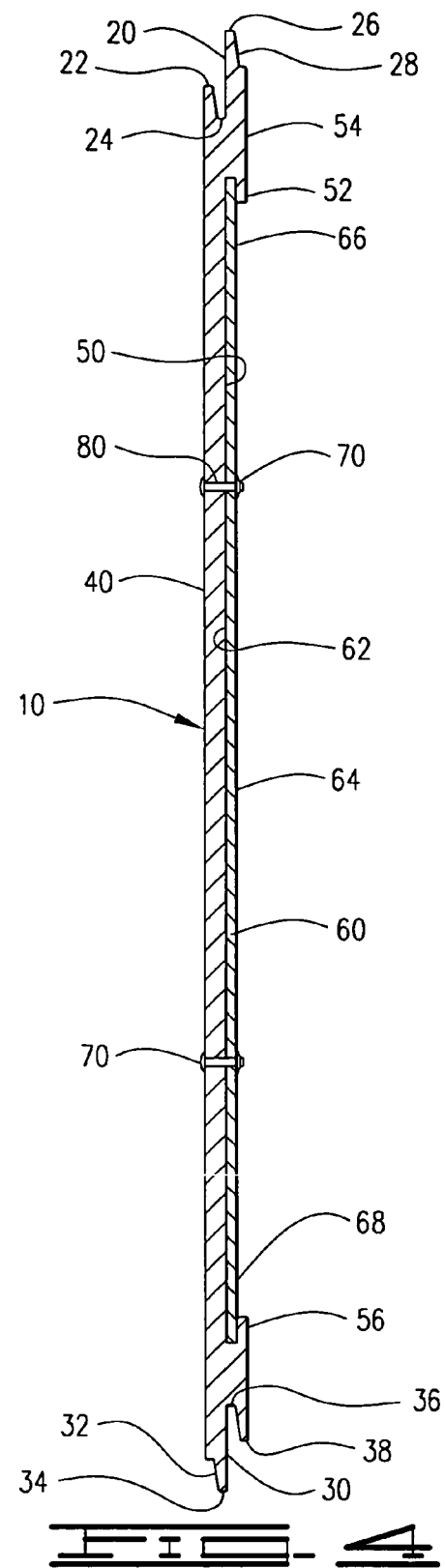

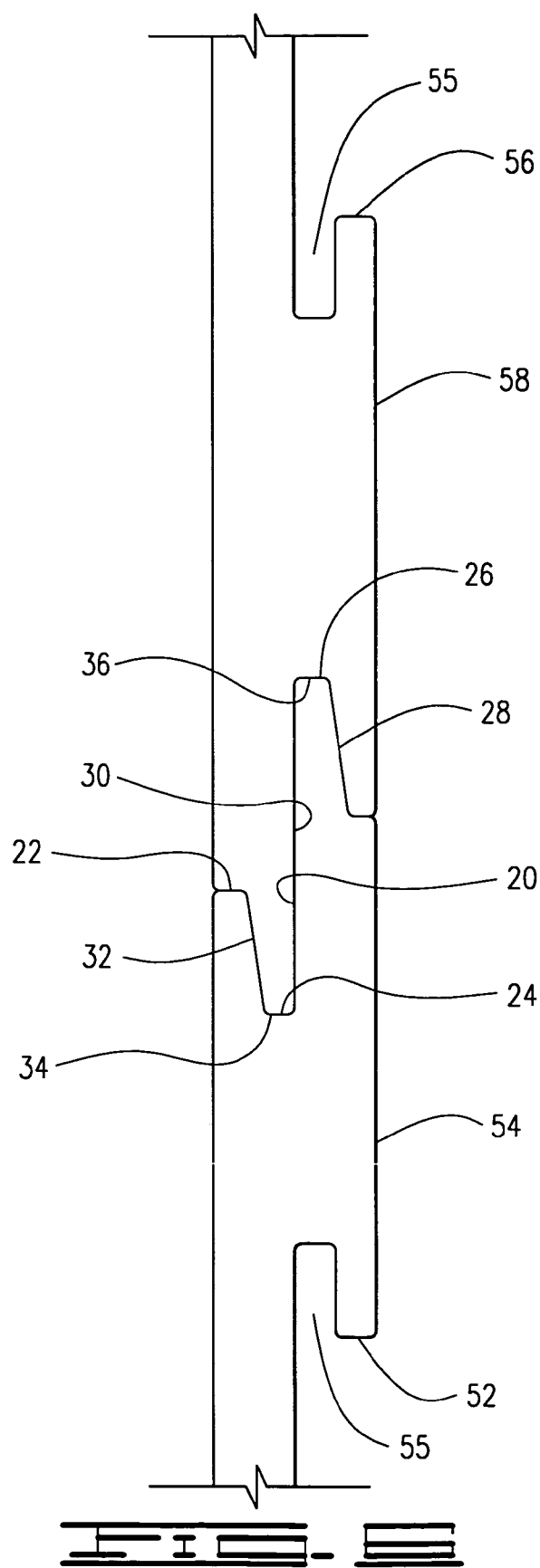

INTERLOCKING CHANNELED TRAILER SIDE PANELS WITH INTEGRATED SLIDING OUTER PANEL INSERTS

CROSS REFERENCE TO RELATED APPLICATIONS

U.S. Provisional Patent App. No. 60/546,888 filed on Feb. 23, 2004.

I. BACKGROUND OF THE INVENTION

1. Field of Invention

A metal trailer interlocking panel attached to a trailer frame used in the construction of an enclosed or paneled trailer, preferably in a horizontal and stacked orientation, includes an upper groove assembly and a conforming and interlocking lower groove assembly, an inner surface welded to a vertical trailer frame member and an outer surface having a lower slot member and an upper slot member forming a sliding channel within which is slid a horizontal outer panel insert riveted to the panel. In the event the panel insert is damaged by hail, road debris, branches or other accidental means, or a simple change in aesthetics or display medium is desired, the panel insert may be exchanged without requiring replacement of the panel. The panel insert may also have an ornamental design or graphic applied to an outer surface, which enables the trailer owner to apply a variety of panel inserts and exchange graphics without having to repaint the entire trailer, and also to allow for change of information which may be applied to the panel inserts for advertising or other textual information.

2. Description of Prior Art

The following United States patents were discovered and are disclosed within this application for utility patent. All relate to trailer panels or other metallic structure panels.

The first series of prior art patents includes other horizontally oriented trailer panels that have a type of interlocking means on upper and lower margins. Those patents include U.S. Pat. Nos. 6,224,142 to McCormack, 5,613,726 to Hobbs, 5,052,741 to Brown, 3,110,371 to Ridder, D410,868 to Hall, Jr. and D430,069 to Collie, Jr. All these panels disclose a metal panel with edges that are interlocking when stacked and prior to attachment to an underlying trailer frame. Opposing upper and lower margins include molded and formed edges which connect to form a linear seal. However, none of them contain an upper or lower margin similar to the present panel, nor do they present an outer surface adapted to receive horizontal slide panels which are riveted to the outer surface.

A second series of prior art patents, including U.S. Pat. Nos. 6,652,018 to Buchholz and 5,526,622 to Augustine, disclose assemblies where vertically oriented frame members retain trailer panels in vertical orientation, with the connected series of frame members and panels comprising side walls of a trailer, the side panels sliding within grooves in the vertical frame members.

A third series of prior art patents disclose various other metal wall panels which having interlocking margins, with U.S. Pat. No 1,913,342 to Schaffert, which discloses interlocking roof panels which would support a roof structure without deformation, the interlocking side margins strengthening the interlocking panels, U.S. Pat. No. D216,480, which discloses a wall panel including a corner assembly, and U.S. Pat. No. 3,043,407 to Marryatt, which is an interlocking grid assembly for catwalks on ships, sidewalk coverings for street openings and other openings requiring a sturdy and self supporting grid material with interlocking side margins.

II. SUMMARY OF THE INVENTION

In the current art of enclosed livestock trailers or racing automobile trailers, most of them have a general component composition of a frame mounted on at least one axle, vertical frame members mounted to a trailer that form a frame for the side and a roof, usually as a single arched member, and some horizontally applied panels or sectioned strips of metal welded to the vertical frame members, stacked and interlocking to some extent. Once assembled and secured, they are either painted or polished to a chrome or aluminum finish and are placed in service. The interior varies, as does the attachment to a towing vehicle. The identified problem arises when the owner is involved in an accident, when the trailer is damaged by hail or wind, when the exterior is scratched by limbs or debris, or when the trailer is adorned with custom graphic or text which either needs changing or simply no longer suits the taste of the owner. An entire refinishing and repainting of the trailer is required to institute repairs or changes to the graphics, which may be costly and require extensive time and money to perform.

It is the primary objective of the current trailer panels to allow for replacement of individual panels on the trailer without a need to replace the entire exterior. It is a secondary objective to provide the panels with external sliding grooves which are adapted to slidably engage panel inserts on each panel, made from a vinyl, metal of resilient plastic, each panel insert held within the panel by the grooves and also held onto the panels by a plurality of rivets, which allow for cosmetic changes or repairs to the trailer by simply removing the rivets and withdrawing the panel inserts from the panels and replacing them with new panel inserts. This provides the owner with the ability to apply custom graphics to the panel inserts and change the panel inserts without changing the panels, allowing the owner himself to change the panel inserts due to cosmetic damage, seasonally, or to change the graphics indicate new text information or graphic design, including team sponsorships, ownership information change, logos, team affiliations, or simply because of a change in taste.

III. DESCRIPTION OF THE DRAWINGS

The following drawings are informal drawings submitted with this provisional patent application.

FIG. 2 is an exterior perspective view of two side panels joined together.

FIG. 3 is an end view of a side panel.

FIG. 4 is an end cross sectional of a side panel with a panel insert.

FIG. 6 is a side view of the relationship between an upper interlocking channel and a lower locking channel of two interlocking frame panels.

IV. DESCRIPTION OF THE PREFERRED EMBODIMENT

Figure 1:
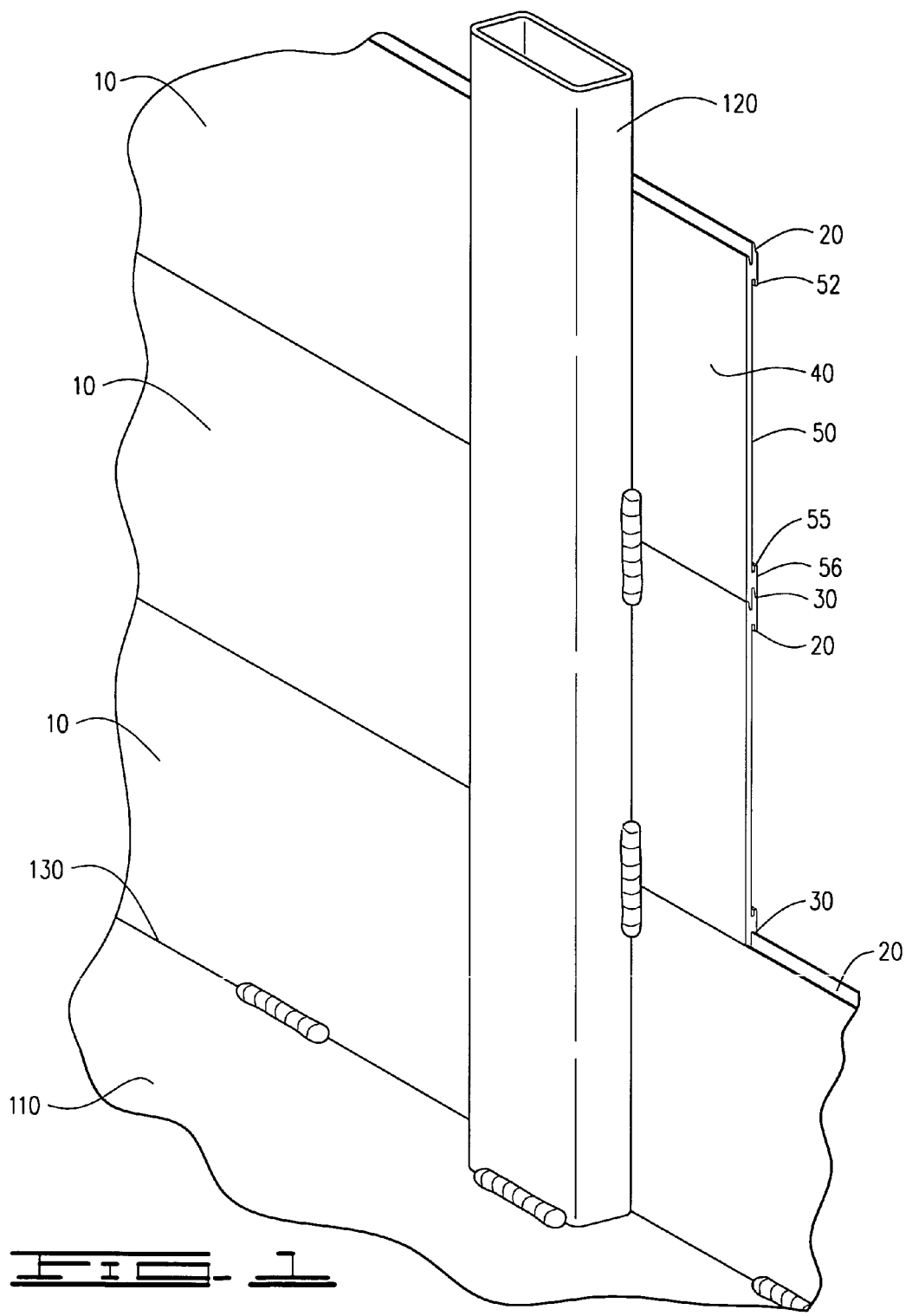
FIG. 1 is an inside perspective view of two joined side panels attached to the vertical frame member.

A metal trailer interlocking frame panel 10, shown in FIGS. 1–6 of the drawings, attached to a trailer frame 110 used in the construction of an enclosed or paneled trailer 100, preferably in a horizontal and stacked orientation, the interlocking frame panel 10 essentially comprising an upper interlocking channel 20 and a conforming lower interlocking channel 30, an inner panel surface 40 welded to a plurality of parallel vertical trailer frame members 120 and a trailer floor frame 130, and an outer panel surface 50 having a lower slot member 56 and an upper slot member 52 forming a sliding channel 55 within which is slid a outer slide insert 60 attached within the sliding channel 55 of the interlocking frame panel 10. The outer slide insert 60 may be further attached by a plurality of rivets 70.

As further disclosed in FIGS. 1–4 and 6, the upper interlocking channel 20 defines an inner locking ridge 22, an inner locking notch 24, on outer locking tab 26 and an outer trough 28. The lower interlocking channel 30 defines an inner trough 32, an inner locking tab 34, an outer locking notch 36 and an outer locking ridge 38. When connecting a first interlocking frame panel 10a to a second interlocking frame panel 10b, indicated only in FIG. 2, the upper interlocking channel 20 of the first interlocking frame panel 10a, or lower panel, is sealably engaged with the lower interlocking channel 30 of the second interlocking frame panel 10b, or upper panel, by respective insertion of the inner locking ridge 22 within the inner trough 32, the inner locking tab 24 within the inner locking notch 34, the outer locking tab 26 within the outer locking notch 36 and the outer locking ridge 28 within the outer trough 38. A closer view of this connection between an upper interlocking channel 20 and a lower interlocking channel 30 is indicated best in FIG. 6. A caulk or sealant material may be applied to the upper interlocking channel 20 and lower interlocking channel 30 prior to engagement to create a further weather seal or moisture deterrent. Once engaged, the inner surfaces 40 of the interlocking frame panels 10 should be flush when welded to the vertical trailer frame member 120, FIG. 1. An outer slot surface 54 of each upper slot member 52 and outer slot surface 58 of each lower slot member 56 should also be flush, FIG. 6.

Although not stating any preferred length, it is preferred that each interlocking frame panel 10 be provided in the full length of the trailer 100 to which the frame panels are applied, having no vertical seams along the entire length of the trailer.

Figure 5:
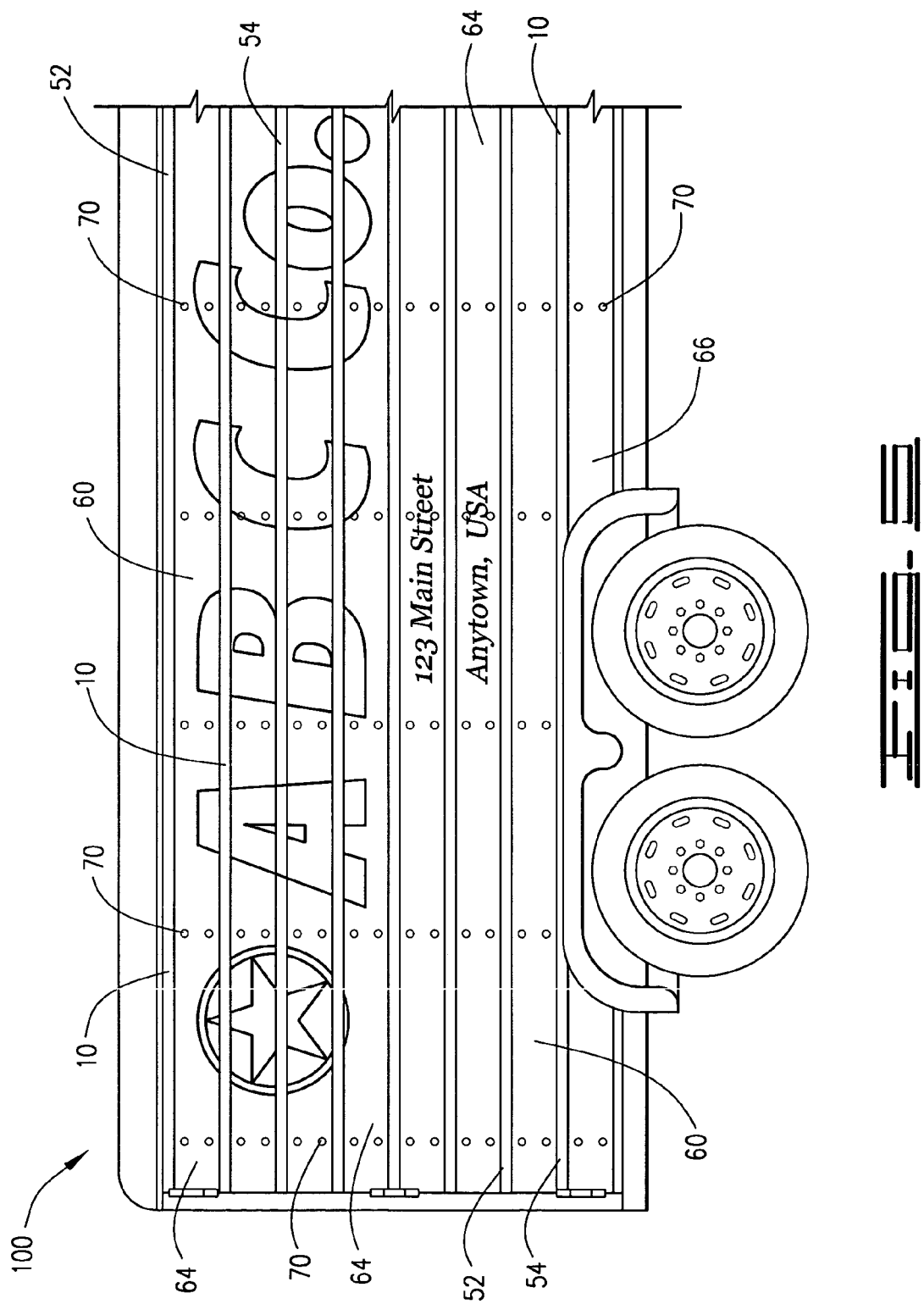
FIG. 5 is a perspective view of the side of a trailer with the side panels and panel inserts forming an ornamental pattern.

Each outer slide insert 60 includes an inner insert surface 62, an outer insert surface 64, an upper edge 66 and a lower edge 68. The outer surface 64 of each outer slide insert 60 may include a color, artistic graphics or logo as chosen by the trailer owner, as indicated by example in FIG. 6 of the drawings. The upper edge 66 of each outer slide insert 60 is directed to the upper slot member 52 of the selected panel contemporaneously with the lower edge 68 directed to the corresponding lower slot member 56 of the selected panel, sliding the outer slide insert 60 within the sliding channel 55 until properly located, with the inner insert surface 62 against the outer panel surface 50 of the interlocking frame panel 10. This is shown in FIG. 5 of the drawings, except this embodiment indicates a rivet 70 attaching the outer slide insert 60 to the interlocking frame panel 20, which may not be required, depending upon the material chosen for the outer slide insert 60 and the tightness of the fit between the outer slide insert 60 and the sliding channel 55. Additionally, as shown in FIG. 5, a series of holes 80 may then be drilled through the outer slide insert 60 through the outer panel surface 50 and inner panel surface 40 of the interlocking frame panel 10, after which one of the plurality of rivets 70 is inserted within each hole 80 to secure the outer slide insert 60 within the sliding channel 55. If necessary, due to the changing taste of the owner, a need to change logo, or to replace a damaged outer slide insert 60 caused by weather or impact, the panels may be simply removed, or, in the case of further attachment by the rivets, the rivets 70 may be removed and another outer slide insert 60 may be exchanged.

The interlocking frame panels 10 are preferably made from aluminum or stainless steel, but may be made of any sturdy metal material with weather and corrosion resisting properties. The outer slide inserts 60 are preferably vinyl, fiberglass or aluminum, which may be provided in sheets, to which the applied color, artistic graphics or logo as chosen by the trailer owner may be applied to the outer insert surface 64, with the sheet thus being cut into the separate outer slide inserts 60, allowing the outer slide panel to be prepared on the sheet instead of to several separate outer slide inserts 60.

Construction of an enclosed or paneled trailer 100 occurs by providing the trailer frame 110 with the plurality of vertical frame members 120 and the trailer floor frame 130 and welding the lower interlocking channel 30 of a first interlocking frame panel 10 to the trailer floor frame 130 and the inner panel surface 40 to each vertical frame member 120, continually horizontally stacking and welding another interlocking frame panel 10 to the vertical frame members 120 and to the prior interlocking frame panel 10 until the trailer 100 is enclosed to the extent required by the owner. The interlocking frame panels 10 may be used to construct a floor, sides or a roof of the trailer, and may even be used to form a door or a trailer ramp.

While the invention has been particularly shown and described with reference to a preferred embodiment thereof, it will be understood by those skilled in the art that changes in form and detail may be made therein without departing from the spirit and scope of the invention.

What is claimed is:

1. A metal trailer interlocking frame panel attached to a trailer frame used in the construction of an enclosed or paneled trailer, said interlocking frame panel essentially comprising:
    an upper interlocking channel;
    a conforming lower interlocking channel;
    an inner panel surface welded to a plurality of parallel vertical trailer frame members and a trailer floor frame;
    an outer panel surface having a lower slot member and an upper slot member forming a sliding channel; and
    an outer slide insert attached within the sliding channel of said interlocking frame panel, said outer slide insert further comprising an inner insert surface, an outer insert surface, an upper edge and a lower edge, said outer slide insert attached within said slide channel of said interlocking frame panel by contemporaneous insertion of said upper edge within said upper slot member and said lower edge within said lower slot member until accordingly positioned, wherein a series of holes are drilled through said outer slide insert through said outer panel surface and inner panel surface of said interlocking frame panel and one of said plurality of rivets is inserted within each said hole to secure said outer slide insert within said sliding channel.

2. The interlocking frame panel, as disclosed in claim 1, further comprising:
said upper interlocking channel defines an inner locking ridge, an inner locking notch, on outer locking tab and an outer trough; and
said lower interlocking channel defines an inner trough, an inner locking tab, an outer locking notch and an outer locking ridge, with attachment of a first interlocking panel to a second interlocking panel performed by respectively engaging and inserting said inner locking ridge within said inner trough, said inner locking tab within said inner locking notch, said outer locking tab within said outer locking notch and said outer locking ridge within said outer trough, wherein said inner panel surface of said first and second interlocking frame panels are flush when welded to said vertical trailer frame member and an outer slot surface of said upper slot member and an outer slot surface of said lower slot member are flush.

3. The outer slide insert, as disclosed in claim 1, further comprising:
an inner insert surface, an outer insert surface, an upper edge and a lower edge, said outer slide insert attached within said slide channel of said interlocking frame panel by contemporaneous insertion of said upper edge within said upper slot member and said lower edge within said lower slot member until accordingly positioned.

4. The interlocking frame panel, as disclosed in claim 1, further comprising:
said upper interlocking channel having an inner locking ridge, an inner locking notch, on outer locking tab and an outer trough and said lower interlocking channel defines an inner trough, an inner locking tab, an outer locking notch and an outer locking ridge, with attachment of a first interlocking panel to a second interlocking panel performed by respectively engaging and inserting said inner locking ridge within said inner trough, said inner locking tab within said inner locking notch, said outer locking tab within said outer locking notch and said outer locking ridge within said outer trough, wherein said inner panel surfaces of said first and second interlocking frame panels are flush when welded to said vertical trailer frame member and an outer slot surface of said upper slot member and an outer slot surface of said lower slot member are flush; and
said outer slide insert having an inner insert surface, an outer insert surface, an upper edge and a lower edge, said outer slide insert attached within said slide channel of said interlocking frame panel by contemporaneous insertion of said upper edge within said upper slot member and said lower edge within said lower slot member until accordingly positioned.

5. The interlocking frame panel, as disclosed in claim 1, further comprising:
said upper interlocking channel having an inner locking ridge, an inner locking notch, on outer locking tab and an outer trough and said lower interlocking channel defines an inner trough, an inner locking tab, an outer locking notch and an outer locking ridge, with attachment of a first interlocking panel to a second interlocking panel performed by respectively engaging and inserting said inner locking ridge within said inner trough, said inner locking tab within said inner locking notch, said outer locking tab within said outer locking notch and said outer locking ridge within said outer trough, wherein said inner panel surfaces of said first and second interlocking frame panels are flush when welded to said vertical trailer frame member and an outer slot surface of said upper slot member and an outer slot surface of said lower slot member are flush; and
said outer slide insert having an inner insert surface, an outer insert surface, an upper edge and a lower edge, said outer slide insert attached within said slide channel of said interlocking frame panel by contemporaneous insertion of said upper edge within said upper slot member and said lower edge within said lower slot member until accordingly positioned wherein a series of holes are drilled through said outer slide insert through said outer panel surface and inner panel surface of said interlocking frame panel and one of said plurality of rivets is inserted within each said hole to secure said outer slide insert within said sliding channel.

* * * * *